United States Patent
Wang et al.

(10) Patent No.: US 10,585,019 B2
(45) Date of Patent: Mar. 10, 2020

(54) NECK ASSEMBLY FOR ANTHROPOMORPHIC TEST DEVICE

(71) Applicant: Humanetics Innovative Solutions, Inc., Farmington Hills, MI (US)

(72) Inventors: Zhenwen Jerry Wang, Farmington Hills, MI (US); Dominic Isopi, Livonia, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 77 days.

(21) Appl. No.: 15/850,153

(22) Filed: Dec. 21, 2017

(65) Prior Publication Data

US 2018/0136083 A1    May 17, 2018

Related U.S. Application Data (63) Continuation-in-part of application No. 14/981,034, filed on Dec. 28, 2015, now Pat. No. 9,972,220.

(60) Provisional application No. 62/486,562, filed on Apr. 18, 2017.

(51) Int. Cl.
```
G09B 23/28      (2006.01)
G01M 17/007     (2006.01)
G09B 23/34      (2006.01)
G01M 7/08       (2006.01)
```

(52) U.S. Cl.
CPC ......... *G01M 17/0078* (2013.01); *G09B 23/34* (2013.01); *G01M 7/08* (2013.01)

(58) Field of Classification Search
USPC .............. 434/262, 267, 274; 72/172, 866.4
See application file for complete search history.

(56) References Cited

U.S. PATENT DOCUMENTS

| | | | |
|---|---|---|---|
| 979,147 | A | 12/1910 | Fryette |
| 2,108,229 | A | 2/1938 | Metz |
| 3,707,782 | A | 1/1973 | Alderson |
| 3,740,871 | A | 6/1973 | Berton et al. |
| 3,753,301 | A | 8/1973 | Daniel et al. |
| 3,754,338 | A | 8/1973 | Culver |

(Continued)

FOREIGN PATENT DOCUMENTS

| | | |
|---|---|---|
| CN | 103203754 A | 7/2013 |
| CN | 103926046 A | 7/2014 |

(Continued)

OTHER PUBLICATIONS

Huang et al., "Development of an Advanced Head/Neck System for 5th Percentile Female Anthropomorphic Test Dummies", Jan. 1, 2002, XP055257963, retrieved from the Internet: URL:http://www-nrd.nhtsa.dot.gov/pdf/bio/proceedings/2002_30/30-6.pdf, pp. 63-76.

(Continued)

*Primary Examiner* — Kurt Fernstrom
(74) *Attorney, Agent, or Firm* — Howard & Howard Attorneys PLLC (57) ABSTRACT

A neck assembly for an anthropomorphic test device (ATD) includes a plurality of vertebra discs, a plurality of ligament joints each having a joint element disposed between the vertebra discs, and a torsion assembly coupled to one of the vertebra discs to allow rotation about an axis of the one of the vertebra discs to simulate torsion response of a human neck.

21 Claims, 6 Drawing Sheets

(56) References Cited

U.S. PATENT DOCUMENTS

| | | | |
|---|---|---|---|
| 3,762,069 A * | 10/1973 | Culver | G09B 23/32 434/274 |
| 3,877,156 A | 4/1975 | Itoh | |
| 3,962,801 A * | 6/1976 | Gonzalez | G09B 23/32 434/274 |
| 4,200,995 A | 5/1980 | Trella | |
| 4,261,113 A | 4/1981 | Aiderson | |
| 4,488,433 A | 12/1984 | Denton et al. | |
| 4,872,841 A * | 10/1989 | Hamilton | G09B 23/30 434/274 |
| 4,948,373 A | 8/1990 | Engels | |
| 5,018,977 A | 5/1991 | Wiley et al. | |
| 5,152,692 A | 10/1992 | Richards | |
| 5,259,765 A | 11/1993 | Richards | |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,665,922 A | 9/1997 | Tsukada et al. | |
| 5,672,059 A | 9/1997 | Browne-Wilkinson | |
| 5,741,989 A | 4/1998 | Viano et al. | |
| 6,422,874 B1 | 7/2002 | Green et al. | |
| 6,439,070 B1 | 8/2002 | Beebe et al. | |
| 6,447,518 B1 | 9/2002 | Krause et al. | |
| 6,749,433 B2 | 6/2004 | Kassai et al. | |
| 6,982,409 B2 | 1/2006 | Huang et al. | |
| 7,086,273 B2 | 8/2006 | Lipmyer | |
| 7,878,080 B2 | 2/2011 | Hwang et al. | |
| 7,942,676 B2 * | 5/2011 | Murdach | G09B 23/30 434/262 |
| RE42,418 E | 6/2011 | Lipmyer | |
| 8,840,404 B2 | 9/2014 | Arthur et al. | |
| 9,011,158 B2 | 4/2015 | Merkle et al. | |
| 2004/0029090 A1 | 2/2004 | Kassai et al. | |
| 2005/0126258 A1 | 6/2005 | Lipmyer | |
| 2009/0025492 A1 | 1/2009 | Hwang et al. | |
| 2013/0000426 A1 | 1/2013 | Arthur et al. | |
| 2013/0213155 A1 | 8/2013 | Ozawa | |
| 2013/0252220 A1 | 9/2013 | Wang | |
| 2013/0327164 A1 | 12/2013 | Wang | |
| 2014/0190279 A1 | 7/2014 | Been et al. | |
| 2014/0190280 A1 | 7/2014 | Been et al. | |
| 2014/0272881 A1 * | 9/2014 | Barsoum | G09B 23/30 434/274 |
| 2014/0294485 A1 | 10/2014 | Mcinnis et al. | |
| 2015/0086957 A1 | 3/2015 | Gibbs et al. | |

FOREIGN PATENT DOCUMENTS

| | | |
|---|---|---|
| CN | 105043707 A | 11/2015 |
| CN | 106217354 A | 12/2016 |
| DE | 2 330 093 | 1/1974 |
| DE | 4 012 691 A1 | 10/1990 |
| DE | 4 117 046 A1 | 11/1991 |
| DE | 102 15 640 A1 | 11/2003 |
| DE | 10 2004 058 022 A1 | 6/2005 |
| DE | 10 2004 058 022 B4 | 12/2007 |
| DE | 10 2007 062 761 B4 | 9/2013 |
| DE | 10 2013 009 815 A1 | 12/2013 |
| EP | 0 709 665 A2 | 5/1996 |
| EP | 1 388 833 A1 | 2/2004 |
| EP | 1 388 833 B1 | 9/2009 |
| EP | 1 388 833 B8 | 11/2009 |
| FR | 2.018.158 | 5/1970 |
| FR | 1 503 956 | 3/1978 |
| FR | 2 646 266 A1 | 10/1990 |
| GB | 2 231 433 A | 11/1990 |
| GB | 2 244 843 A | 12/1991 |
| GB | 2 231 433 B | 5/1993 |
| GB | 2 244 843 B | 4/1994 |
| GB | 2 344 922 A | 6/2000 |
| JP | 50-114835 | 9/1975 |
| JP | 2005-227266 A | 8/2005 |
| JP | 2012-202708 A | 10/2012 |
| JP | 2013-257322 A | 12/2013 |
| JP | 5664391 B2 | 2/2015 |
| KR | 20010103291 A | 11/2011 |
| WO | 98/30995 | 7/1998 |
| WO | 98/47122 | 10/1998 |
| WO | 2012/044225 A1 | 4/2012 |

OTHER PUBLICATIONS

Hu et al., "Head-Neck Finite Element Model of the Crash Test Dummy THOR", International Journal of Crashworthiness, Woodhead Publishing, CA, vol. 9, No. 2, Mar. 1, 2004 pp. 175-186 XP019384752, ISSN:1573-8965.

European Search Report for Application No. EP 18167334.4; dated Jul. 19, 2018; 7 pages.

Machine-Assisted English translation of Application No. KR20010103291, downloaded from google.com/patent on Oct. 19, 2018. 15 pages.

Machine-Assisted English translation of abstract for Application No. CN103203754, downloaded from espacenet.com on Oct. 19, 2018. 13 pages.

Machine-Assisted English translation of abstract for Application No. CN103926046, downloaded from espacenet.com on Oct. 19, 2018. 25 pages.

Machine-Assisted English translation of abstract for Application No. CN105043707, downloaded from espacenet.com on Oct. 19, 2018. 48 pages.

Machine-Assisted English translation of abstract for Application No. CN106217354, downloaded from espacenet.com on Oct. 19, 2018. 13 pages.

* cited by examiner

NECK ASSEMBLY FOR ANTHROPOMORPHIC TEST DEVICE

CROSS-REFERENCE TO RELATED APPLICATION(S)

The present application claims the benefit of U.S. Provisional Patent Application No. 62/486,562, filed Apr. 18, 2017, and is a continuation-in-part of U.S. patent application Ser. No. 14/981,034, filed Dec. 28, 2015, both of which are hereby expressly incorporated herein by reference in their entirety.

BACKGROUND OF THE INVENTION

1. Field of the Invention

The present invention relates generally to an Anthropomorphic Test Device (ATD) and, more particularly, to a neck assembly for an ATD that can be used to assess and predict injuries under impact.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angular rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD engineers design crash test dummies with the proper anthropometry that reflects a total weight, center of gravity, mass moment of inertia and range of motion similar to that of a human body so as to increase the biofidelity of the crash test dummy.

It is known to provide a neck for a crash test dummy. In one crash test dummy, the neck has a cylindrical design with grooves around the neck. A groove depth and angle are used to control a performance of the neck. While this neck provides good flexion and rear extension performance, it lacks the ability to adjust a lateral performance. In another crash test dummy, the neck has good lateral performance, but its flexion and extension performance were not so good and cannot be adjusted easily due to its axial symmetrical mechanical design.

From a biomechanics research study, a human neck has different performance in forward flexion and lateral bending. The bending stiffness are similar between the two directions up to a certain angles, where the frontal and lateral bending start to differentiate each other. However, when forward flexion reaches eighty degrees (80°) bending, the neck bottoms out and the stiffness increases quickly. For lateral bending, the neck bottoms out near fifty degrees (50°).

It has been difficult to replicate a human neck for an ATD. In particular, a neck was needed to be developed to be unique for ATD's due to different responses in each direction. As a result, it is desirable to develop a neck for an ATD that can perform like a human neck for flexion, extension, lateral bending, and torsion. Therefore, there is a need in the art to provide a neck assembly for use in an ATD so that biofidelity of the ATD is improved.

SUMMARY OF THE INVENTION

Accordingly, the present invention provides a neck assembly for an ATD. The neck assembly includes a plurality of vertebra discs. The neck assembly also includes a plurality of ligament joints each having a joint element disposed between the vertebra discs. The neck assembly further includes a torsion element coupled on one of the vertebra discs to allow rotation about an axis of the one of the vertebra discs to simulate torsion response of a human neck.

In addition, the present invention provides an ATD including a body and a neck assembly connected to the body. The neck assembly includes a plurality of vertebra discs and a plurality of ligament joints each having a joint element disposed between the vertebra discs, and a torsion assembly coupled to one of the vertebra discs to allow rotation about an axis of the one of the vertebra discs to simulate torsion response of a human neck.

One advantage of the present invention is that a new neck assembly is provided for an ATD. Another advantage of the present invention is that the neck assembly for an ATD can simulate a human neck's biomechanical performance. Yet another advantage of the present invention is that the neck assembly for an ATD simulates a human neck in all directions. Still another advantage of the present invention is that the neck assembly for an ATD can meet biomechanical response requirements in flexion, extension, lateral bending, and torsion. A further advantage of the present invention is that the neck assembly for an ATD follows a human neck vertebra curvature posture. Yet a further advantage of the present invention is that the neck assembly for an ATD includes inserts having a profile that reduces the amount of neck lateral rotation for early bottoming out. A still further advantage of the present invention is that the neck assembly for an ATD includes inserts having a tunable profile that allows the neck to perform differently in flexion and lateral bending. Another advantage of the present invention is that the ligament joints have a cone-shaped cross-section to evenly distribute the load like a human. Yet another advantage of the present invention is that the neck assembly has superior biofidelity response and reduced complexity to make it user friendly.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
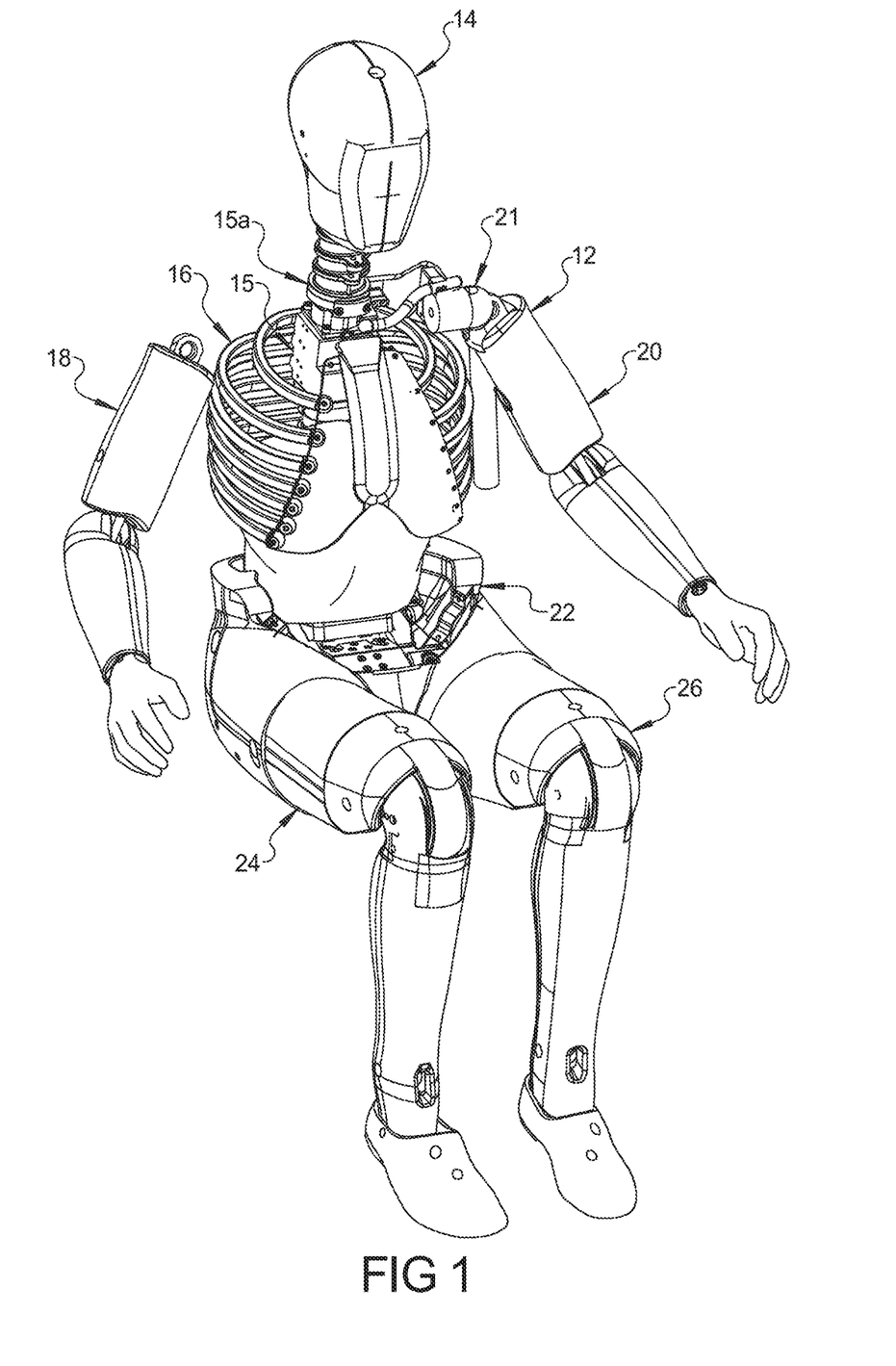
FIG. 1 is a perspective view of an ATD.
Figure 2:
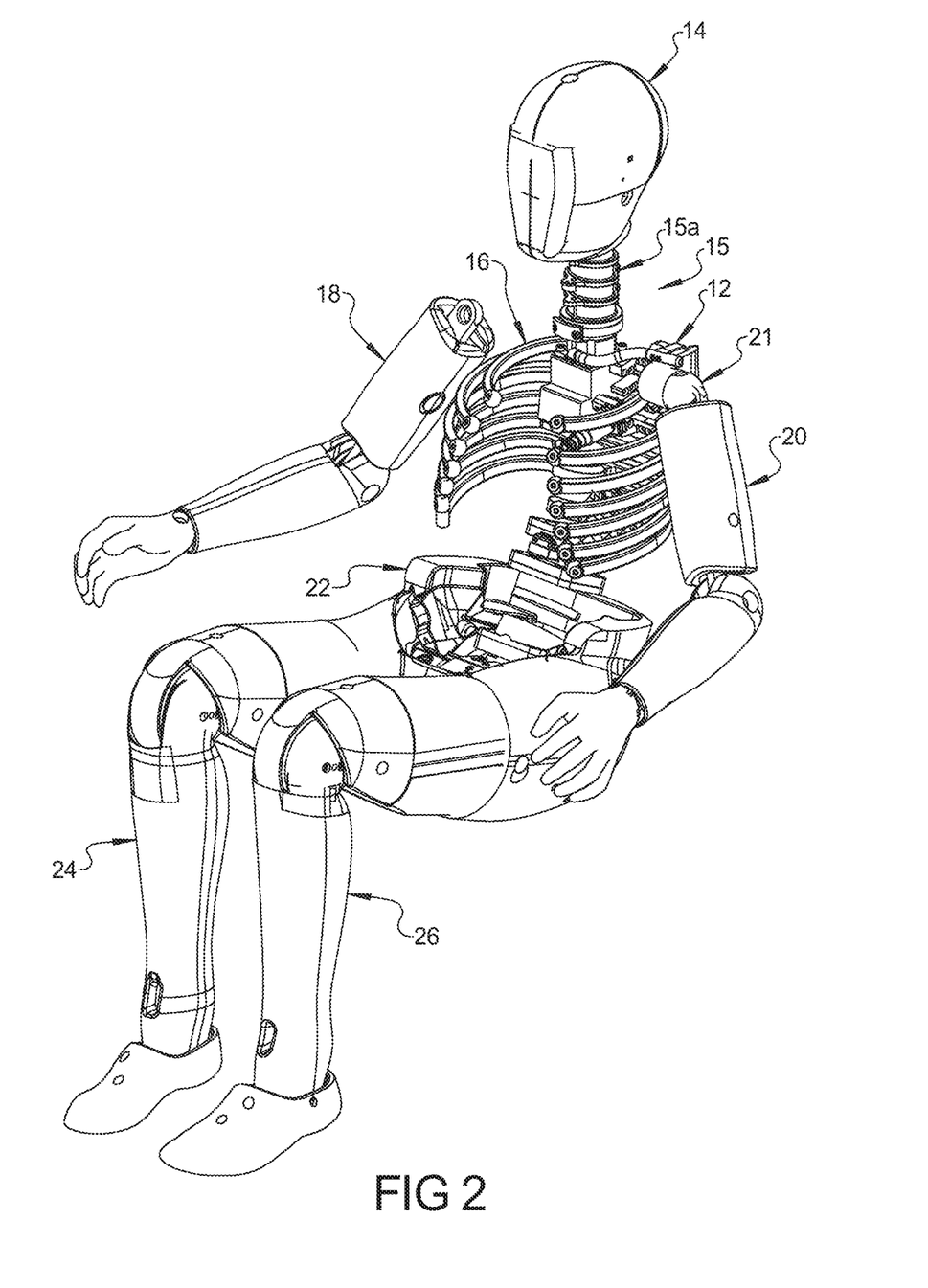
FIG. 2 is another perspective view of the ATD of FIG. 1.

Referring to the drawings and in particular FIGS. 1 and 2, one embodiment of an ATD, for example a crash test dummy, according to the present invention, is generally indicated at 12. In one embodiment, the crash test dummy 12 is of a fiftieth percentile (50%) male type and is illustrated in a sitting posture. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. It should also be appreciated that the crash test dummy 12 may be of any suitable size.

As illustrated in FIG. 1, the crash test dummy 12 includes a head assembly, generally indicated at 14. The head assembly 14 includes a one-piece plastic skull, an instrumentation core, and a vinyl skin. The instrumentation core is removable for access to head instrumentation contained inside the head assembly 14. The crash test dummy 12 also includes a spine assembly 15 having a neck assembly 15a with an upper end mounted to the head assembly 14 by a nodding block (not shown) and a nodding joint (not shown) of the spine assembly 15. The neck assembly 15a has a lower end extending into a torso area of the crash test dummy 12 and is connected to a spine mounting weldment (not shown) by an adapter assembly (not shown). The spine assembly 15 extends downwardly to a pelvis assembly 22 to be described. An example of a neck assembly is disclosed in U.S. patent application Ser. No. 14/981,034, filed Dec. 28, 2015, the entire disclosure of which is expressly incorporated herein by reference.

The torso area of the crash test dummy 12 includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly, generally indicated at 21. The left arm assembly 20 includes a clavicle link (not shown), which connects a clavicle (not shown) to the top of the spine assembly 15. It should be appreciated that the right arm assembly 18 is constructed in a similar manner.

The crash test dummy 12 also includes a pelvis assembly 22 connected to the pelvic adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly to achieve a good biofidelity of the crash test dummy 12.

Figure 3:
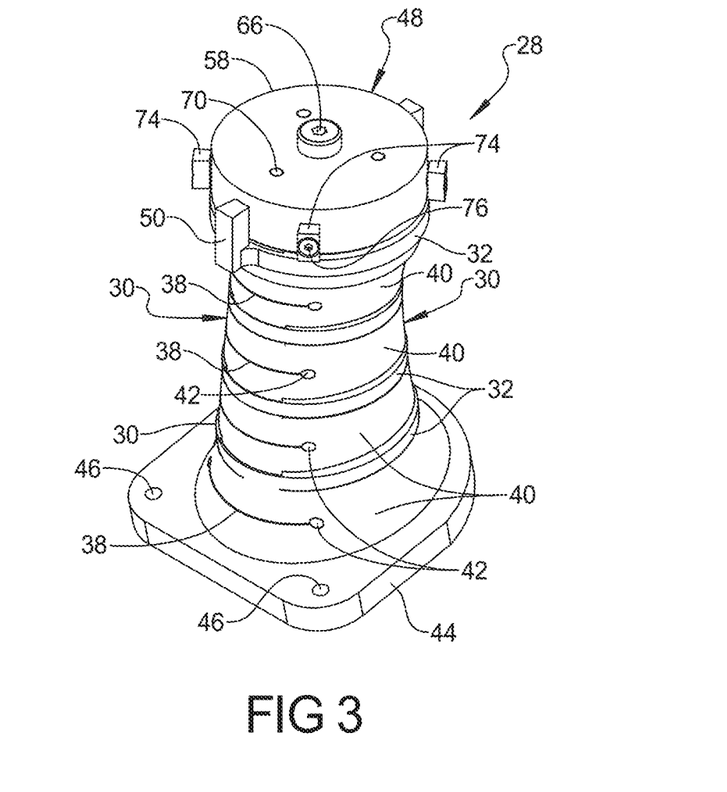
FIG. 3 is a perspective view of a neck assembly, according to one embodiment of the present invention, for the ATD of FIGS. 1 and 2.
Figure 4:
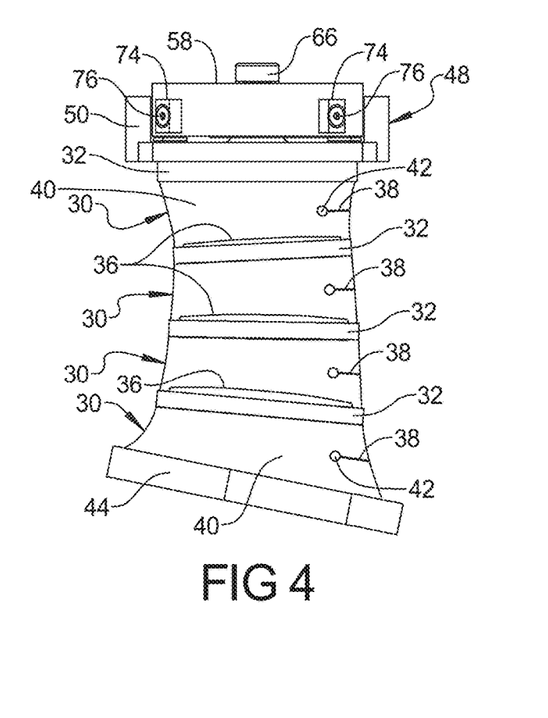
FIG. 4 is a side elevational view of the neck assembly of FIG. 3.
Figure 5:
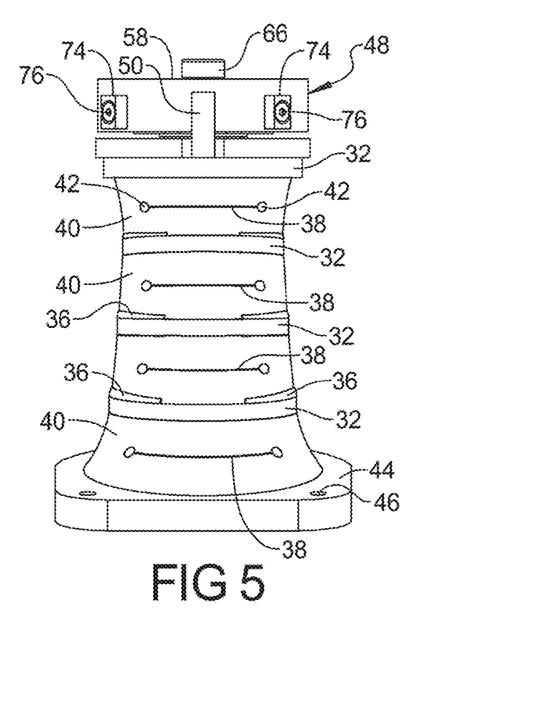
FIG. 5 is a front elevational view of the neck assembly of FIG. 3.
Figure 6:
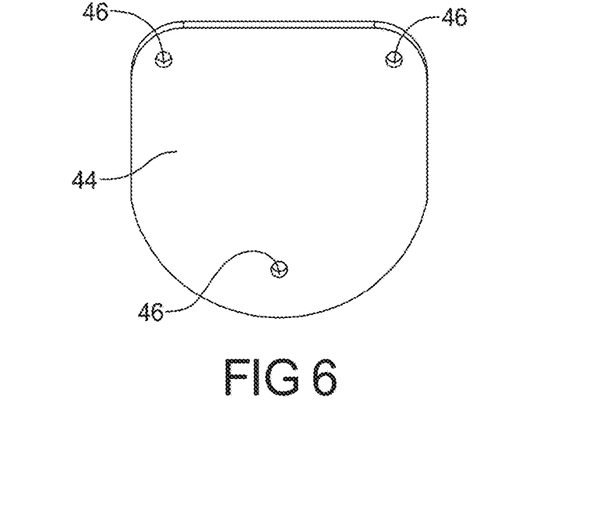
FIG. 6 is a bottom view of the neck assembly of FIG. 3.
Figure 7:
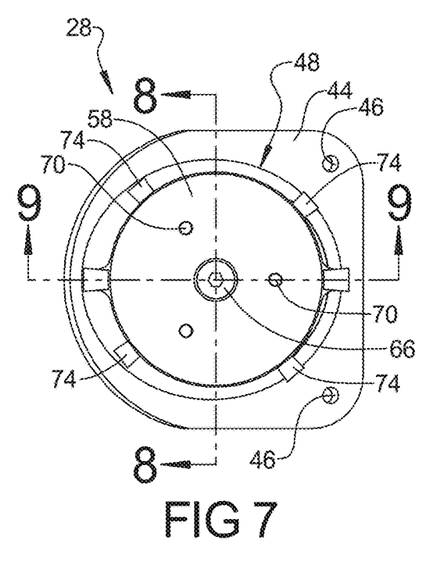
FIG. 7 is a top view of the neck assembly of FIG. 3.
Figure 8:
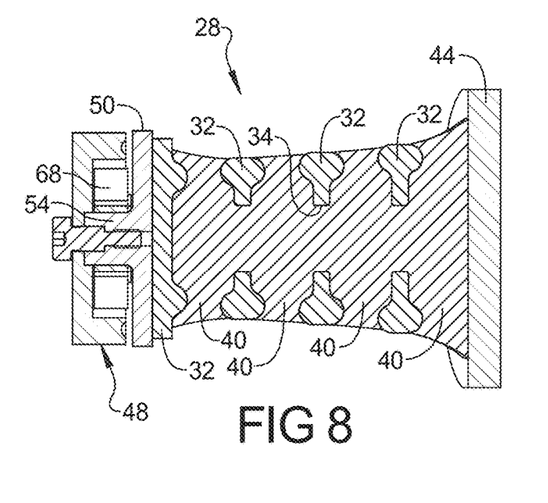
FIG. 8 is a sectional view taken along line 8-8 of FIG. 7.
Figure 9:
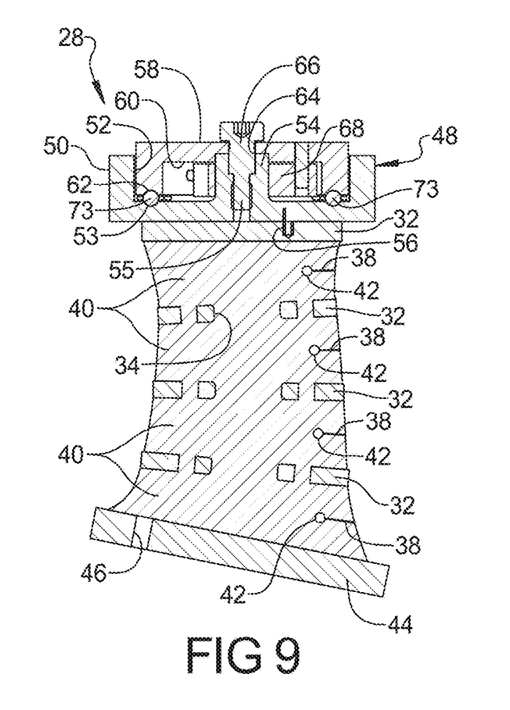
FIG. 9 is a sectional view taken along line 8-8 of FIG. 7.

Referring to FIGS. 3-9, one embodiment of a neck assembly 28, according to the present invention, is shown to replace the neck assembly 15a. The neck assembly 28 represents a human neck. The neck assembly 28 includes a plurality of modular vertebra segments, generally indicated at 30. In the embodiment illustrated, the neck assembly 28 has four (4) cervical spine vertebra segments 30. As illustrated in FIGS. 3-5, each vertebra segment 30 includes a vertebra disc 32 having a height or thickness corresponding to its location in the cervical of the neck assembly 28. In one embodiment, the vertebra disc 32 is made of a relatively rigid material such as metal or hard plastic. The vertebra disc 32 includes at least one aperture 34 extending axially therethrough. In the embodiment illustrated, the aperture 34 is centrally located within the vertebra disc 32. The vertebra disc 32 is generally circular in shape, but may be any suitable shape to simulate a human neck. The vertebra disc 32 has one or more raised portions 36 on at least one side thereof. In the embodiment illustrated, the vertebra disc 32 has a pair of opposed raised portions 36 on both sides thereof. The raised portions 36 are generally arcuate in shape. The raised portions 36 have a varying height with a greatest height in a middle thereof and reducing in height to the ends thereof. It should be appreciated that the raised portions 36 of the vertebra disc 32 will be located on the sides of the neck assembly 28. It should also be appreciated that it is intended to limit the lateral range of motion since a human neck lateral bending angle is less than that of its flexion.

Referring to FIGS. 3-5, each vertebra segment 30 includes a ligament joint 38 disposed between adjacent vertebra discs 32. In the embodiment illustrated, one ligament joint 38 is disposed between a pair of vertebra discs 32. As illustrated, each ligament joint 38 has a joint element 40 disposed between a pair of the vertebra discs 32. The joint element 40 is made of a flexible material such as an elastomeric material, for example, rubber. In one embodiment, the joint element 40 has a frusto-conical shape. The joint element 40 is connected to an upper vertebra disc 32 and a lower vertebra disc 32 via a suitable mechanism such as an adhesive. It should be appreciated that each ligament joint 38 is integral and one-piece.

The joint element 40 includes a cutout 42 on a front side to soften the neck assembly 28 to meet the extension performance for different spine curvature. The stiffness of the human neck rearward extensions is typically softer than that of its forward flexion. The cutouts 42 are located on a front side of the neck assembly 28 in the joint element 40 between the vertebra discs 32. In the embodiment illustrated, the cutouts 42 are a round cylindrical cavity, which is molded into the joint element 40, but may be any suitable shape. In one embodiment, a shape blade can be used to cut a through round hole. This process is to facilitate rubber manufacturing and also improve the durability of the neck assembly 28. It should be appreciated that the mold hole will prevent rubber tearing during testing. It should also be appreciated that, with this feature, the forward neck flexion performance would remain the same due to the compression on the front side of the neck assembly 28. It should further be appreciated that, for extension, the side with stiffness reduction will be in tension, the cutouts 42 will open up and therefore reduce the amount of materials engaged in bending. It should still further be appreciated that the stiffness is reduced accordingly.

The neck assembly 28 includes a lower mounting plate 44 connected to the spine assembly by a suitable mechanism such as fasteners (not shown). In one embodiment, the lower mounting plate 44 has a plurality of apertures 46 extending therethrough to receive the fasteners. The neck assembly 28 includes one of the upper vertebra discs 32 at an upper end of one of the ligament joints 40. In this embodiment, the upper vertebra disc 32 has a planar upper surface. It should be appreciate that the neck assembly 28 has a cross-section that is increased gradually from the top to the bottom since the load is higher toward the bottom of the neck when the head is impacted in a crash.

Referring to FIGS. 3-10, the neck assembly 28 also includes a torsion assembly, generally indicated at 48, to simulate neck torsion response. The torsion assembly 38 includes a bottom member 50. The bottom member 50 is generally circular in shape. The bottom member 50 has a cavity 52 extending axially therein. The bottom member 50 also has a groove 53 extending axially therein and circumferentially thereabout a bottom of the cavity 52 to form a bottom race which hosts a ball bearing or roller 73 between the bottom member 50 and a top member 58 to be described. The bottom member 50 includes a center protrusion 54 extending axially from a bottom of the cavity 52. The bottom member 50 is made of rigid material. The bottom member 50 is disposed on the planar surface of and coupled to the upper vertebra disc 32 by a suitable mechanism such as a fastener 56.

The torsion assembly 48 includes a top member 58 cooperating with and rotatable relative to the bottom member 50. The top member 58 is generally circular in shape. The top member 58 has a cavity 60 extending axially therein to accommodate the ball bearing or roller 73. The top member 58 also has a groove 62 extending axially therein and circumferentially thereabout a top of the cavity 60 to form a top race. The top member 58 has an aperture 64 extending axially therethrough. The torsion assembly 48 includes a fastener 66 extending through the aperture 64 and into the aperture 55 of the bottom member 50. It should be appreciated that the fastener 66 allow the top member 58 to rotate relative to the bottom member 50 about an axis extending axially through the fastener 66. It should be appreciated that the top member 58 is connected to the head assembly 14 by a suitable mechanism such as fasteners.

The torsion assembly 48 includes a torsion element 68 disposed between the bottom member 50 and the top member 58. The torsion element 68 has a first ring portion 70 disposed about the protrusion 54 of the bottom member 50. The torsion member 68 has a second ring portion 72 spaced radially from the first ring portion 70 and interconnected by a plurality of spoke portions 174 spaced circumferentially and extending radially between the first ring portion 70 and the second ring portion 72. The torsion element 68 is coupled to the top member 58 by a suitable mechanism such as a plurality of pins 70. The torsion element 68 is made of a flexible material such as an elastomeric material, for example rubber, to provide a low resistance. The torsion element 68 is integral, unitary, and one-piece. The outer ring 72 is bonded to the bottom member 50 and the inner ring 70 is bonded to center protrusion 54.

The torsion assembly 48 includes a plurality of rollers 73 disposed between the bottom member 50 and the top member 58. The rollers 73 are generally spherical in shape. The rollers 73 are disposed in the bottom race 53 and top race 62 of the bottom member 50 and top member 58, respectively. It should be appreciated that the rollers 73 provide minimum friction and assist relative movement between the bottom member 50 and top member 58.

Figure 10:
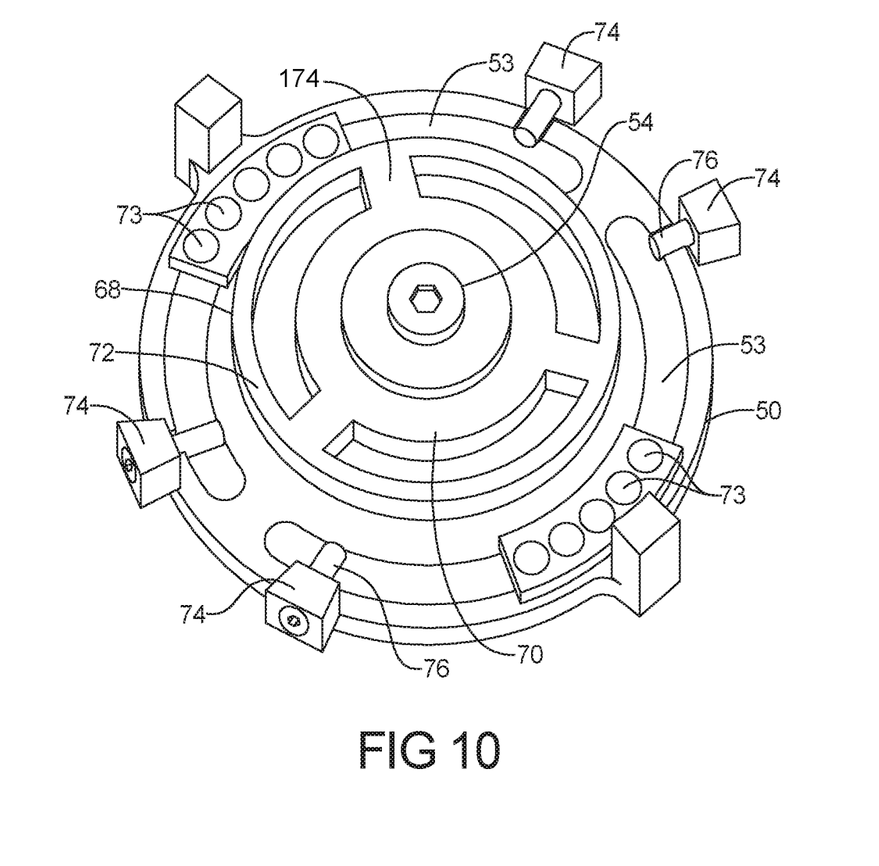
FIG. 10 is a perspective view of a torsion element of the neck assembly of FIG. 3.

The torsion assembly 48 includes a plurality of torsion stops 74 to limit angular rotation of the top member 58 relative to the bottom member 50. The torsion stops 74 are spaced circumferentially about the top member 58. Each torsion stop 74 includes a fastener 76 extending into a space between the bottom race 53 and top race 62 to be engaged by the rollers 73. As illustrated in FIG. 10, the torsion stops 74 limit the range of rotation up to approximately fifty (50) degrees. When the rotation reaches the predetermined maximum range of rotation, the modular vertebra segments 30 of the neck assembly 28 will then be engaged to generate a proper human like neck torsion response. With the additional torsion element 68, the neck assembly 28 will be able to respond in a low torsion resistance up to approximately fifty (50) degrees when the torsion stops 74 will be engaged. This low torsion will also be sufficient to bring the neck assembly 28 back to its normal orthogonal position when external load is removed. It should be appreciated that the neck assembly 28 has similar flexion and biomechanical response up to approximately fifty-five (55) degrees.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A neck assembly for an anthropomorphic test device (ATD) comprising:
   a plurality of vertebra discs;
   a joint element disposed between each respective pair of said vertebra discs; and
   a torsion assembly coupled to one of said vertebra discs to allow rotation about an axis of said one of said vertebra discs to simulate torsion response of a human neck, wherein said torsion assembly includes a plurality of torsion stops to limit a range of rotation of said neck assembly.

2. A neck assembly as set forth in claim 1, wherein said torsion assembly includes a bottom member coupled to one of said vertebra discs and a top member cooperating with and rotatable relative to said bottom member to allow rotation of said top member of said torsion assembly about an axis of said one of said vertebra discs to simulate torsion response of a human neck.

3. A neck assembly as set forth in claim 1 wherein said range of rotation is up to approximately fifty (50) degrees.

4. A neck assembly as set forth in claim 1 wherein said torsion assembly includes a torsion element made of a flexible material.

5. A neck assembly as set forth in claim 1 wherein each of said vertebra discs include a least one raised portion on at least one side thereof.

6. A neck assembly as set forth in claim 5 wherein said at least one raised portion is generally arcuate in shape.

7. A neck assembly as set forth in claim 1 wherein said vertebra discs have a profile that can simulate angles of the human neck in all directions.

8. A neck assembly as set forth in claim 7 wherein said profile varies in height with a greatest height being in a middle thereof and reducing in height toward ends thereof.

9. A neck assembly as set forth in claim 1 wherein said joint element includes at least one cutout on at least one side thereof.

10. A neck assembly as set forth in claim 9 wherein said at least one cutout is on a front side of said joint element.

11. A neck assembly for an anthropomorphic test device (ATD) comprising:
    a plurality of vertebra discs;
    a joint element disposed between each respective pair of said vertebra discs; and
    a torsion assembly coupled to one of said vertebra discs to simulate torsion response of a human neck and includes a torsion element made of a flexible material and a plurality of torsion stops to limit a range of rotation of said torsion element.

12. An anthropomorphic test device (ATD) comprising:
    a body;
    a neck assembly connected to said body; and
        said neck assembly comprising a plurality of vertebra segments including a plurality of vertebra discs and a joint element disposed between each respective pair of said vertebra discs, and a torsion assembly coupled to one of said vertebra discs to allow rotation about an axis of said one of said vertebra discs to simulate torsion response of a human neck, wherein said torsion assembly includes a plurality of torsion stops to limit a range of rotation of said neck assembly.

13. A neck assembly as set forth in claim 12, wherein said torsion assembly includes a bottom member coupled to one of said vertebra discs and a top member cooperating with and rotatable relative to said bottom member to allow rotation of said top member of said torsion assembly about an axis of said one of said vertebra discs to simulate torsion response of a human neck.

14. An anthropomorphic test device as set forth in claim 12 wherein said range of rotation is up to approximately fifty (50) degrees.

15. An anthropomorphic test device as set forth in claim 12 wherein said torsion assembly includes a torsion element made of a flexible material.

16. An anthropomorphic test device as set forth in claim 12 wherein each of said vertebra discs include a least one raised portion on at least one side thereof.

17. An anthropomorphic test device as set forth in claim 16 wherein said at least one raised portion is generally arcuate in shape.

18. An anthropomorphic test device as set forth in claim 12 wherein said vertebra discs have a profile that can simulate angles of the human neck in all directions.

19. An anthropomorphic test device as set forth in claim 18 wherein said profile varies in height with a greatest height being in a middle thereof and reducing in height toward ends thereof.

20. An anthropomorphic test device as set forth in claim 12 wherein said joint element includes at least one cutout on at least one side thereof.

21. An anthropomorphic test device as set forth in claim 20 wherein said cutout is on a front side of said joint element.

* * * * *